No. 743,576. PATENTED NOV. 10, 1903.
J. C. SHEKEY & F. H. SHEPHARD.
FEEDER FOR CORN HUSKERS.
APPLICATION FILED JAN. 22, 1903.
NO MODEL. 4 SHEETS—SHEET 1.

No. 743,576. PATENTED NOV. 10, 1903.
J. C. SHEKEY & F. H. SHEPHARD.
FEEDER FOR CORN HUSKERS.
APPLICATION FILED JAN. 22, 1903.
NO MODEL. 4 SHEETS—SHEET 3.

Witnesses:
Geo. W. Young.
B. C. Roloff.

Inventors:
Joseph C. Shekey
Frank H. Shephard
By H. G. Underwood
Attorney

No. 743,576. PATENTED NOV. 10, 1903.
J. C. SHEKEY & F. H. SHEPHARD.
FEEDER FOR CORN HUSKERS.
APPLICATION FILED JAN. 22, 1903.
NO MODEL. 4 SHEETS—SHEET 4.

No. 743,576. Patented November 10, 1903.

UNITED STATES PATENT OFFICE.

JOSEPH C. SHEKEY AND FRANK H. SHEPHARD, OF JOHNSON CREEK, WISCONSIN.

FEEDER FOR CORN-HUSKERS.

SPECIFICATION forming part of Letters Patent No. 743,576, dated November 10, 1903.

Application filed January 22, 1903. Serial No. 140,084. (No model.)

*To all whom it may concern:*

Be it known that we, JOSEPH C. SHEKEY and FRANK H. SHEPHARD, both citizens of the United States, and residents of Johnson Creek, in the county of Jefferson and State of Wisconsin, have invented certain new and useful Improvements in Feeders for Corn-Huskers; and we do hereby declare that the following is a full, clear, and exact description thereof.

Our invention relates to feeding and band-cutting devices designed to be attached to corn huskers, shredders, and cutters; and it consists in certain peculiarities of construction and combination of parts, as will be fully set forth hereinafter in connection with the accompanying drawings and subsequently claimed.

Figure 1:
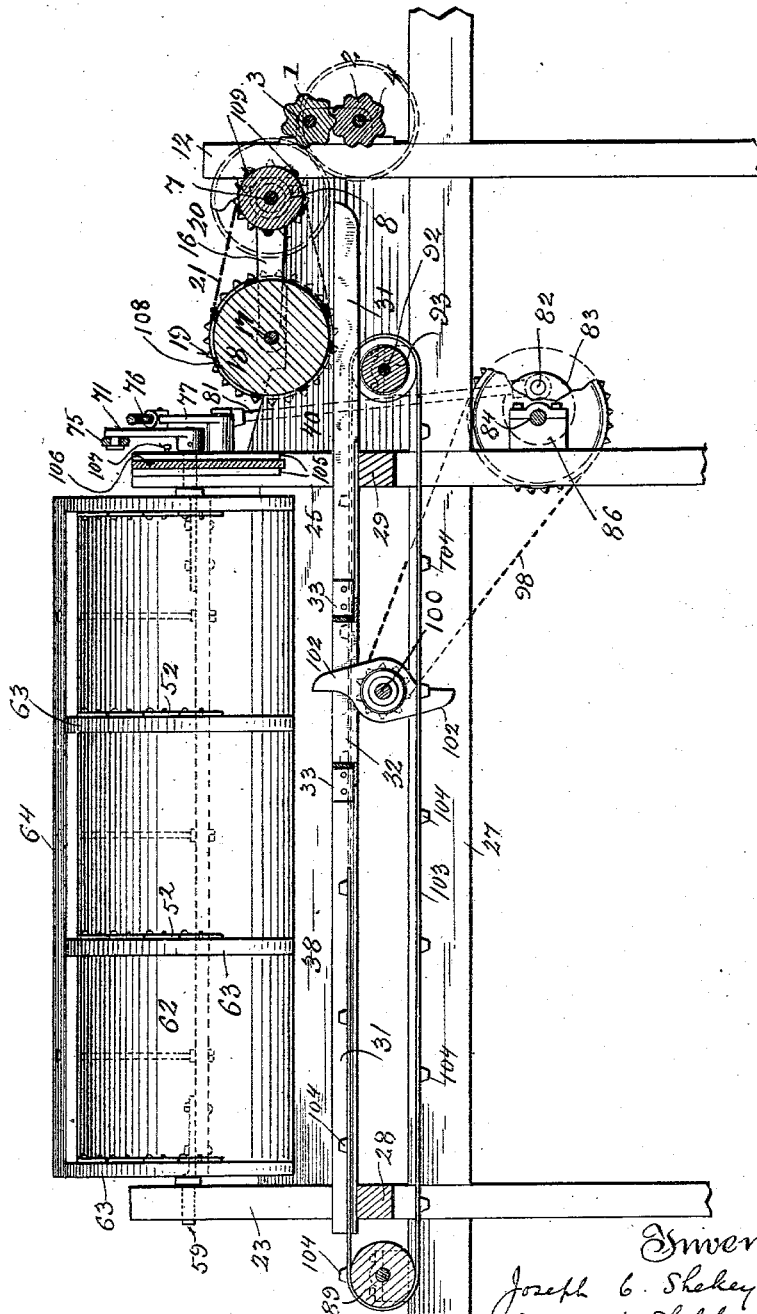
Figure 2:
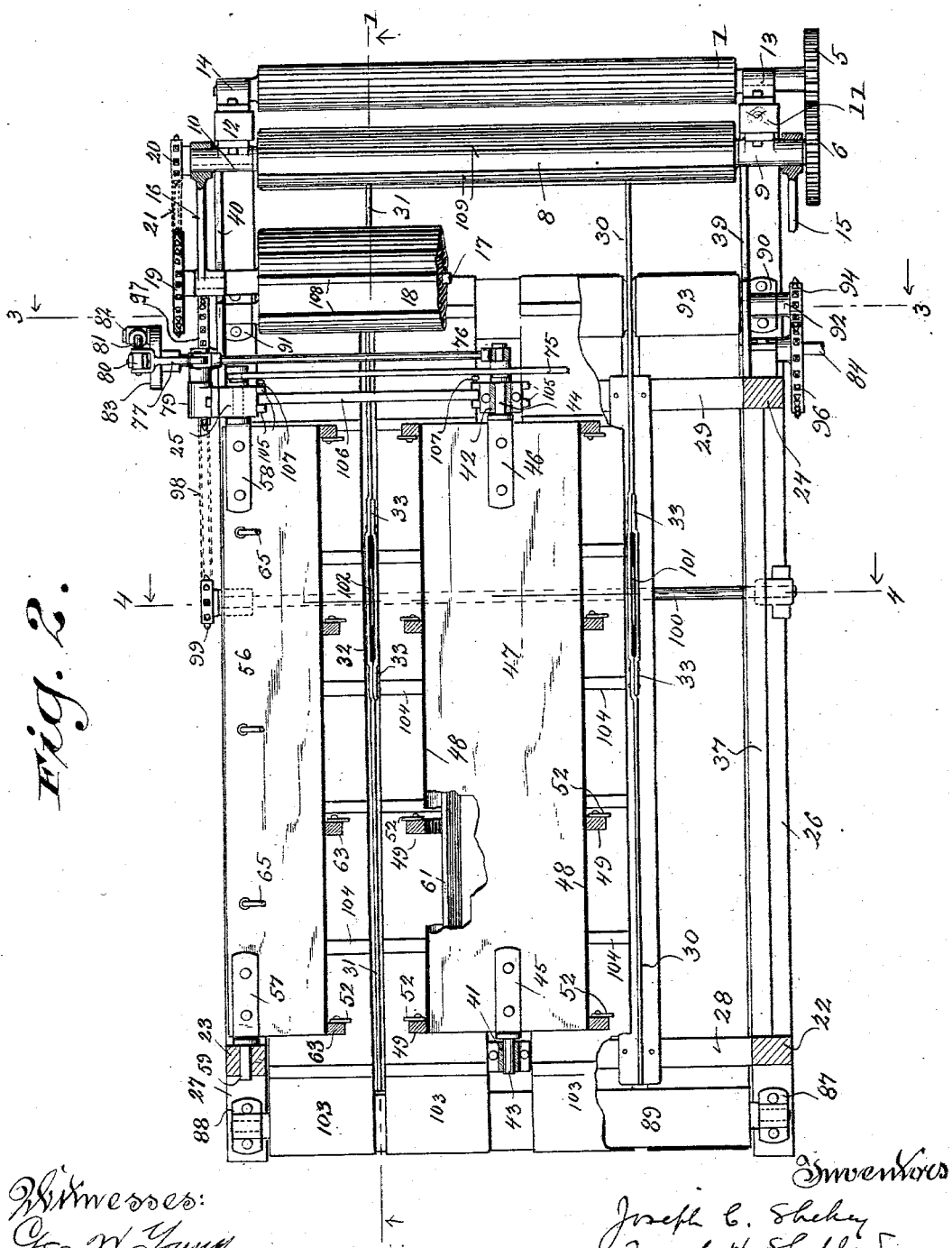
Figure 3:
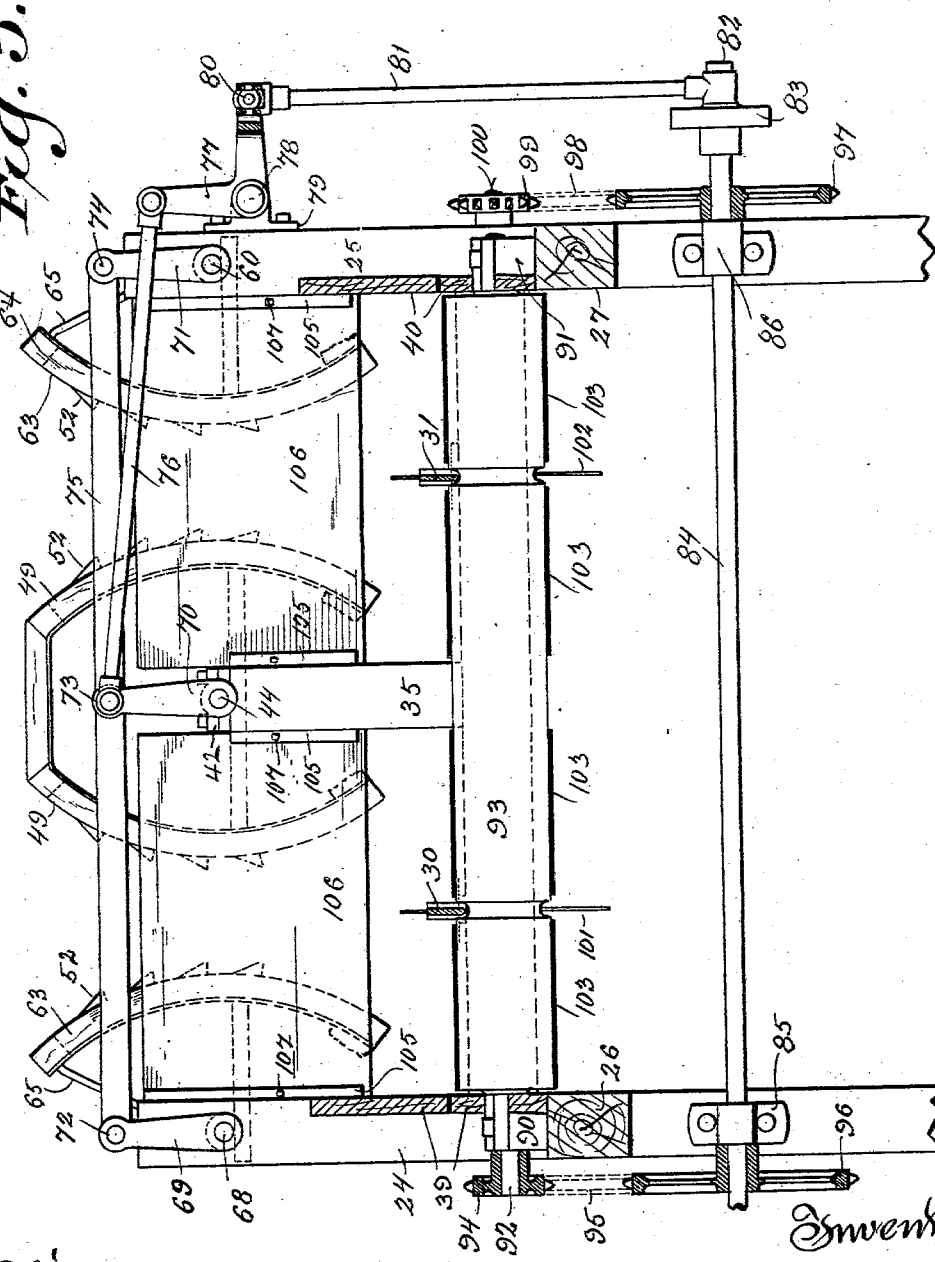
Figure 4:
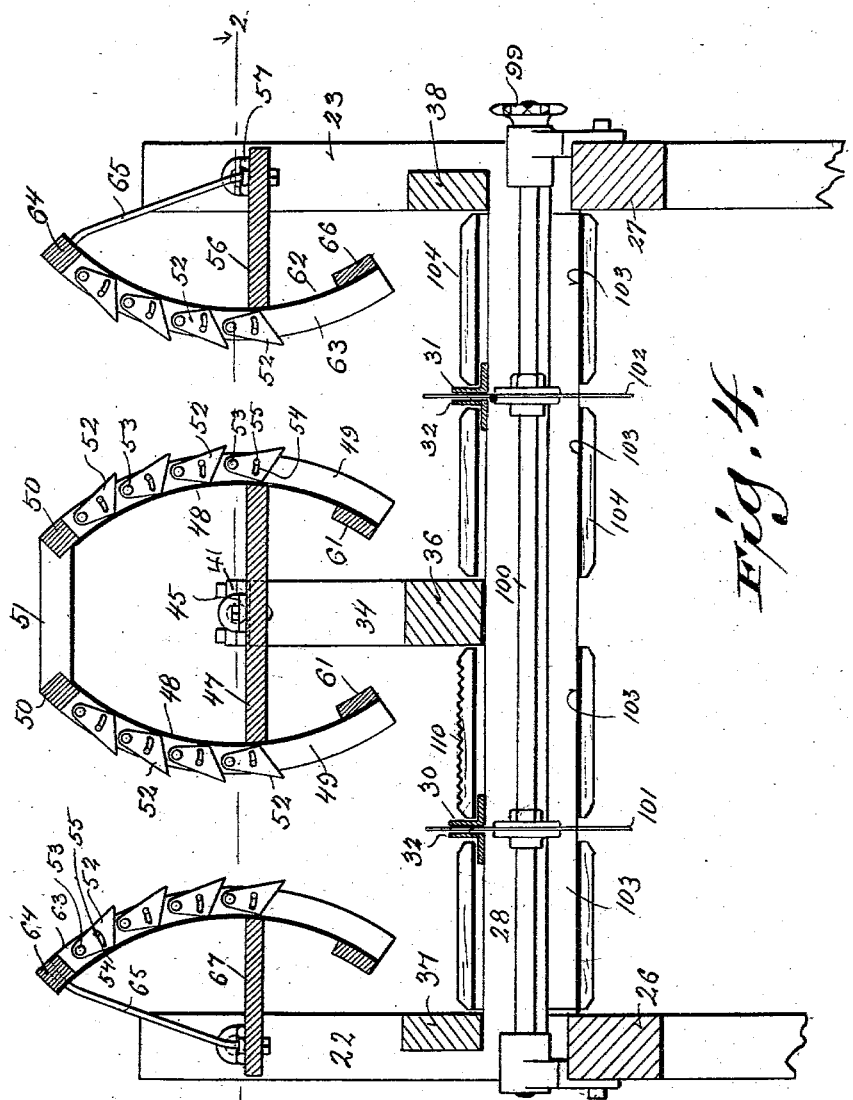

In the said drawings, Figure 1 is a vertical longitudinal sectional view of the devices embodying our present invention, taken on the plane indicated by the line 1 1 in Fig. 2. Fig. 2 is a view, partly in plan and partly broken away and in section, on the line 2 2 of Fig. 4, of our said devices. Figs. 3 and 4 are transverse vertical sectional views taken, respectively, on the planes indicated by the lines 3 3 and 4 4 in Fig. 2.

Our devices are adapted for attachment to a corn husker and shredder or cutter of any approved make to constitute means for cutting the bands on the bundles of cornstalks and spreading the stalks evenly, while automatically feeding them forward to the snapping-rollers, and therefore we have not deemed it necessary to show any part of the corn-husker beyond part of its frame and the snapping-rollers just named.

Referring to the drawings by numerals, 1 and 2 designate the said snapping-rollers, the upper roller 1 being an idler, whose shaft 3 rests in suitable bearings, while the shaft 4 of the lower roller 2 carries at one end a gear-wheel 5, which meshes with a like gear-wheel 6 on the adjacent end of the shaft 7 of a transverse roller 8, which shaft is journaled in boxes 9 10, secured to one side of the uprights 11 12, forming part of the frame of the corn-husker, the boxes 13 14 for the snapping-rollers being secured to the opposite side of said uprights.

15 16 designate a pair of arms, which have hubs at one end loosely surrounding the ends of the boxes 9 10, the other ends of said arms terminating in boxes, which receive the shaft 17 of a large transverse roller 18, designed to act as a pressure and feed roller for the cornstalks, as hereinafter described. The end of this shaft 17 beyond the arm 16 carries a sprocket-wheel 19, and the adjacent end of the shaft 7 carries a sprocket-wheel 20 of half the size of wheel 19, the two sprocket-wheels being connected by a sprocket-chain 21.

At the end opposite the snapping-rollers are the rear uprights 22 23, and in front of them are the uprights 24 25 back of the front uprights 11 12, all of said uprights on each side being in line with each other and all rising above the plane of the longitudinal sills 26 27 of the husking-machine, the continuations of these uprights below said plane forming part of the framework of said machine. Between the uprights 22 23 is shown the rear cross-beam 28, and between the uprights 24 25 is the forward cross-beam 29. Resting on and bolted to these cross-beams are the guides 30 31, each of which for the greater part of its length consists of a strip of T-iron inverted, the horizontal flanges of each being cut off just forward of the cross-beam 29, so that only the vertical flanges project under the rollers 18 and 8, while back of said cross-beam 29 the said guides are slotted through their horizontal flanges, as shown at 32, and their vertical flanges offset and spliced, as shown at 33 33. Rising from the center of the cross-beam 28 is a post 34, and a like post 35 rises from the center of cross-beam 29, there being a partition between them, here shown in the form of a longitudinal brace-beam 36, though the form of this partition is immaterial, and at each side are side boards 37 38 on the cross-beams 28 29 between the uprights 22 24 and 23 25, there being solid side pieces 39 40 in front of the said side boards 37 38, filling the space between the uprights 24 11 and 25 12 and extending down to the sills 26 27.

We will next describe the spreading devices, and first the central device between the center posts 34 35. On the top of each of these posts are boxes 41 42, respectively, with longitudinal bearings therein for the reception of the studs 43 44 on the ends of the straps 45 46, respectively, the said straps being secured to the longitudinal plank 47, and extending the whole length of the said plank on each side thereof are continuous sheet-metal side pieces 48 48, and at intervals ribs 49 49 (preferably of wood) are secured to said sheet-metal sides, the said ribs being connected at top by the longitudinal strips 50 and at intervals by the cross-strips 51, the lower ends of the metal side pieces being strengthened by longitudinal strips 61 61. The front edges of the ribs 49 are shown provided with series of suspended spreading-plates 52 52, each consisting of a sharp-pointed piece of metal of generally triangular shape in the preferred form herein illustrated, depending from a pivot-bolt 53, and with an arc-slot 54 in the lower part for the reception of a pin 55, which limits the movement of the plate 52 as the spreading device is rocked or oscillated, as hereinafter described. On each side of the described central device is another spreader, each of which is practically like one-half of the central spreader. One of the side spreaders has a plank 56, secured to strips 57 58, the strap 57 terminating in a stud 59, journaled in the rear upright 23, and the strap 58 terminates in a stud 60, which is journaled in and extends through the forward upright 25 on that side. The inner end of this plank 56 has a continuous metal side piece secured thereto, as shown at 62, provided on its exterior with a series of ribs 63, connected at top by a longitudinal strip 64, from which upper strip there extends a series of braces 65, whose other ends are secured to the plank 56, and the lower inner edge of the side piece 62 is strengthened by a longitudinal strip 66. The ribs 63 are provided with the series of suspended spreading-plates 52 52, just like the described ribs 49 of the central spreading device, any desired number of these plates 52 being employed with any of the ribs. On the other side of the central or double spreading device is the counterpart of the just-described side or single spreading device, both facing toward the center, the plank 67 of the left-hand device being supported by straps whose studs are journaled in the uprights 22 24, the stud 68 on the forward strap extending through the upright 24.

The studs 68, 44, and 60 on the forward strips of the three described clamps 67, 47, and 56 are each provided with a crank-arm (marked, respectively, 69, 70, and 71) and are all connected by pivots 72 73 74 to the transverse link 75, and the central pivot-pin 73 is further pivotally connected to the pitman 76, whose other end is pivoted to one arm of the bell-crank lever 77. This lever is shown pivoted at 78 to a bearing 79 on the upright 25, and the other arm of said lever 77 is connected by a universal joint 80 to the connecting-rod 81, the other end of which is secured to the wrist-pin 82 on a crank-wheel 83 below. This crank-wheel 83 is at one end of the drive-shaft 84, which latter extends transversely, and is journaled in bearings 85 86 in the continuations of the uprights 24 25 below the sills 26 27.

Journaled in boxes 87 88 at the rear end of the sills 26 27 is the shaft of the rear belt-roller 89, and similarly journaled in boxes 90 91 near the front end of said sills is the shaft 92 of the front belt-roller 93, the latter being preferably grooved, as shown, so that the front vertical flanged ends of the guides 30 31 can be depressed to a lower plane. The end of the roller-shaft 92 which is journaled in box 90 projects beyond the same and beyond sill 26 and receives a small sprocket-wheel 94, which is geared by sprocket-chain 95 to a sprocket-wheel 96 on the drive-shaft 84, this wheel 96 being three times the diameter of the wheel 94. At its opposite end the drive-shaft 84 carries another sprocket-wheel 97, (of the same size as wheel 96,) and the wheel 97 is geared by sprocket-chain 98 to the small sprocket-wheel 99 on the transverse knife-shaft 100, which latter shaft has fast thereon the knives 101 102, which in the revolution of said shaft 100 move through the slots 32 32 of the guides 30 31.

The carrier-belts (four of which are shown in the present illustration) marked 103 are endless belts passing around the rollers 89 93 and are provided at intervals with the transverse cleats 104 104, the said belts being separated by the guides 30 31, which rise above the horizontal plane of said carrier-belts to insure this separation, and the center posts 34 35 and central partition 36.

Secured to the inner faces of the uprights 24 25 and to the opposed faces of the center post 35 are vertical guide-strips 105 105, arranged in pairs to form guideways between them, in which end-gates 106 have vertical movement, set-screws 107 being provided to hold the said end-gates in any desired adjustment, according to the space it is desired to leave between the lower edges of the end-gates and the carrier-belts below.

In order to increase the efficiency of the first-described pressure and feed rollers 8 and 18, we find it desirable to supply the same with exterior longitudinal ribs 108 109 or similar projections, so that a better hold may be obtained on the material passing beneath.

The operation of our devices will be readily understood from the foregoing description of their construction taken in connection with the accompanying drawings. The bundles of cornstalks containing the ears and tied with cords in the usual manner are fed in from the top between the central and side spreading devices with the butt-ends of the stalks toward the front back of the end-gates 106 and above the described carrier-belts 103 103, and as the drive-shaft 84 revolves all the described mechanism is set in motion and the spreading devices force the bundles down upon the knives 101 102, which cut the cords by which the bundles are tied, and the spreading-plates 52 52 force the stalks to each side of the line of the knives and upon the carrier-belts 103 103, which carry the stalks forward beneath the end-gates 106 and the pressure and feed rollers 18 8 to the snapping-rollers 1 2, which snap off the ears, while the stalks pass on between the snapping-rollers and are crushed thereby and delivered to the shredding or cutting mechanism of the machine to which our devices are attached, the guides 30 31 serving to keep the stalks in proper line in their forward movement. The cleats 104 on the carrier-belts 103 and the ribs or projections 108 109 on the pressure and feed rollers 18 8 take hold of the stalks and insure their forward movement, and in some instances we have found it desirable to notch certain of said cleats and ribs, as indicated at 110 in Fig. 4, when the said stalks are unusually hard and slippery.

The mechanism for rocking or oscillating the spreading devices is best shown in Fig. 3, the arrangement of cranks, links, connecting rods and levers, and adjacent parts being such that the adjacent faces of the ribs which carry the spreading-plates 52 will move in opposite directions up and down alternately, whereby the spreading action on the stalks is continuous and thorough while the said stalks are being fed forward by the means described.

In order to prevent the roller 18 from dropping down too far, and thus getting in the way of the cleats on the carrier-belts, the boxes at the ends of the arms 15 16, in which the shaft of said roller is journaled, will rest on the upper surfaces of the side pieces 39 40, and thus this roller 18, (which we call a "floating" roller,) while able to be freely moved upward, as required by the volume of the cornstalks passing under it, can never drop so far down as to interfere with the proper operation of the device.

Having thus described our invention, what we claim as new, and desire to secure by Letters Patent, is—

1. In a feeder for corn-huskers, the combination with an endless carrier, of rocking or oscillating stalk-spreaders, each carrying a series of suspended independently-movable spreader-plates.

2. In a feeder for corn-huskers, the combination with an endless carrier, of a series of rocking or oscillating stalk-spreaders, supported above said carrier, a series of swinging spreader-plates suspended from each stalk-spreader, and means for simultaneously moving the opposed faces of said spreaders in opposite directions.

3. In a feeder for corn-huskers, the combination with separated endless carriers, of rocking or oscillating stalk-spreaders, supported above said carriers, and each carrying a series of suspended swinging spreader-plates, and a band-cutting knife supported below said separated carriers and projecting up between them.

4. In a feeder for corn-huskers, the combination with separated endless carriers, of rocking or oscillating stalk-spreaders, supported above said carriers, and each carrying a series of suspended swinging spreader-plates, and a revoluble shaft supported beneath the said separable carriers, and provided with a knife projecting up between them.

5. In a feeder for corn-huskers, the combination with separated endless carriers, of a guide-rail rigidly supported between the adjacent opposed side edges of said carriers, said rail rising above the horizontal plane of said carriers, and being slotted intermediate of its ends, and a band-cutting knife supported beneath the slot in said guide-rail and projecting up therethrough.

6. In a feeder for corn-huskers, the combination with a series of separated endless carriers, of slotted guide-rails rigidly supported between said carriers, a series of rocking or oscillating stalk-spreaders supported above said carriers, a transverse revoluble shaft supported beneath the carriers, and having band-cutting knives projecting up through the slots in the guide-rails, and a drive-shaft and connecting mechanism for simultaneously operating the stalk-spreaders and the knife-shaft.

7. In a feeder for corn-huskers, a series of stalk-spreaders, each carrying a series of suspended swinging sharp-pointed spreader-plates, and means for simultaneously rocking the opposed faces of said spreaders in opposite directions.

8. In a feeder for corn-huskers, a series of stalk-spreaders, each comprising continuous side pieces, and exterior ribs, whose faces carry a series of suspended swinging sharp-pointed spreader-plates, having arc-slots in their lower portions and stops projecting through said slots to limit the motion of said plates, and means for simultaneously rocking the opposed faces of said spreaders in opposite directions.

9. In a feeder for corn-huskers, the combination with an endless carrier, and guide-rails projecting beyond the forward end of same, of a pair of pressure and feed rollers, one of which is supported in stationary bearings and the other journaled in arms pivotally secured to said bearings, and suspended over said guide-rails, a stop for limiting the downward movement of the last-named roller, sprocket-wheels on the shafts of said rollers, and a sprocket-chain connecting said sprocket-wheels.

10. In a feeder for corn-huskers, the combination with an endless carrier, and guide-rails projecting beyond the forward end of same, stalk-spreading devices supported above the endless carrier, a vertically-movable pressure and feed roller suspended above the plane of the guide-rails, and vertically-movable partitions back of said pressure and feed roller, to adjustably regulate the amount of material to be fed under the latter.

In testimony that we claim the foregoing we have hereunto set our hands, at Johnson Creek, in the county of Jefferson and State of Wisconsin, in the presence of two witnesses.

JOSEPH C. SHEKEY.
FRANK H. SHEPHARD.

Witnesses:
H. J. GRELL,
F. W. GRELL.